Patented Feb. 2, 1943

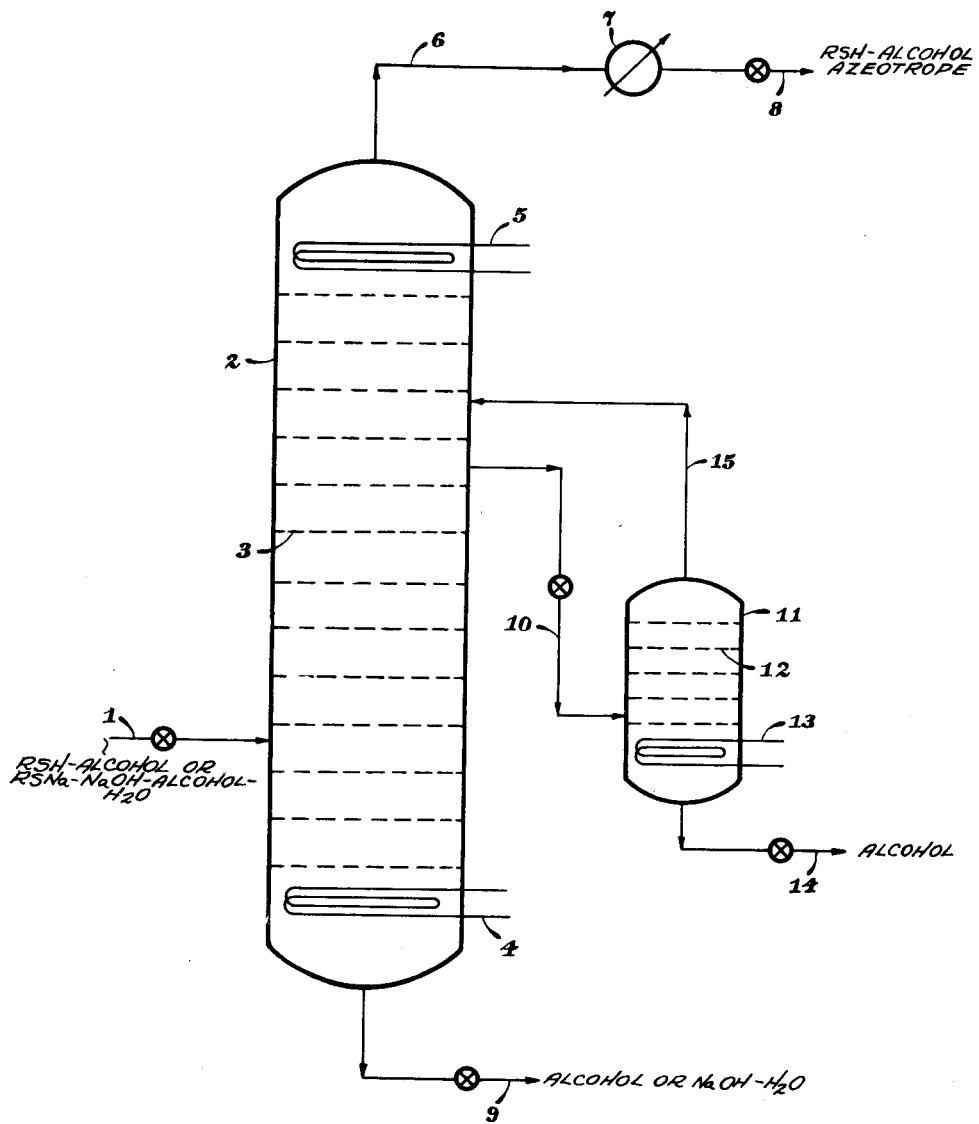

2,309,653

UNITED STATES PATENT OFFICE

2,309,653

REMOVAL OF MERCAPTANS FROM MERCAPTAN-SOLVENT MIXTURES

Leonard N. Leum, Upper Darby, and Edwin R. Birkhimer, Philadelphia, Pa., assignors to The Atlantic Refining Company, Philadelphia, Pa., a corporation of Pennsylvania Application March 21, 1941, Serial No. 384,605

3 Claims. (Cl. 202—42)

The present invention relates to a method for separating mercaptans from organic solvents containing same, and more particularly to the separation of mercaptans from mercaptan-alcohol mixtures produced during the regeneration of spent alcoholic alkali solutions resulting from the treatment of mercaptan-containing hydrocarbon oils with alcoholic alkali solutions.

It has been proposed heretofore to desulfurize hydrocarbon oils, and particularly gasoline, by treating same with alcoholic alkali solutions or alcoholic alkali solutions containing varying amounts of water, whereby mercaptans contained in the gasoline are converted into alkali mercaptides and extracted from the oil. It has also been proposed to regenerate the spent alcoholic alkali solutions containing mercaptides by distilling the alcohol from the spent solution and thereafter heating the residue to decompose the mercaptides and drive off the resulting mercaptans, whereby the alkali is regenerated for reuse. However, one of the major difficulties encountered in this method of regeneration is that in the initial distillation to recover the alcohol from the spent solution, considerable quantities of mercaptans are liberated and thus contaminate the recovered alcohol, thereby rendering same unfit for reuse in the desulfurization of additional quantities of gasoline.

In accordance with the present invention, we have been able to separate from a mercaptan-solvent mixture, and particularly a mercaptan-alcohol mixture, sufficient of the mercaptan content to produce alcohol suitable for use in the desulfurization of hydrocarbon oils. This we accomplish by subjecting the mercaptan-alcohol mixture to distillation, whereby there is vaporized from the mixture a mercaptan-alcohol azeotrope having a boiling point or boiling range below that of the alcohol. By distilling off this azeotropic fraction containing the bulk of the mercaptans initially present in the mixture, we obtain a residuum consisting of alcohol having a substantially reduced mercaptan content and suitable for use in desulfurizing additional quantities of mercaptan-containing hydrocarbon oil. The volume of the azeotropic fraction which must be distilled off will vary, depending upon the mercaptan content of the mixture and the molecular weight of the mercaptans. In general, we have found that 80 percent or more of the mercaptan content of a mercaptan-alcohol mixture may be removed by distilling off not more than about the first 10 percent of the mixture, and that 95 percent or more of the mercaptan content will be removed in the first 15 percent of the mixture distilled off. For example, in the case of a mercaptan-methanol mixture containing up to about 160 mg. sulfur as RSH per 100 cc. (RSH containing from 1 to 6 carbon atoms per molecule), 97 percent or more of the mercaptans are removed as an azeotrope in the first 15 percent fraction distilled off.

Our invention may be further understood with reference to the accompanying drawing, which illustrates diagrammatically a system suitable for carrying out our process.

Referring to the drawing, a mercaptan-solvent mixture, for example a mercaptan-methanol mixture containing 43 mg. sulfur as RSH per 100 cc., is passed in the liquid or vapor phase through valve-controlled pipe 1 into the lower section of fractionating tower 2 provided with bubble trays 3, heating coil 4, and dephlegmating coil 5. Heat may be supplied to the contents of tower 2 by circulating a heating medium, such as steam, through heating coil 4. The mercaptan-methanol vapors are fractionated in tower 2, and a mercaptan-methanol azeotrope boiling below the boiling point of methanol is withdrawn, as vapor, from the top of the tower by means of pipe 6, condensed in condenser 7, and the condensate removed from the system through valve-controlled pipe 8. This condensate, which may comprise, for example, 10 percent of the mixture initially charged to the tower, contains the major portion of the mercaptans initially present in the charge, i. e., 80 percent or more of the original mercaptan content. This mercaptan-methanol azeotrope may be subjected to further treatment for the separation therefrom of mercaptans. For example, the azeotrope may be diluted with water to effect "salting out" of the mercaptans, or the azeotrope may be treated with an alkaline agent for the removal of mercaptans.

From the bottom of fractionating tower 2 is withdrawn the bulk of the methanol having a substantially reduced mercaptan content. The methanol so recovered comprises about 90 percent of the mixture charged to the tower, and this may be passed through valve-controlled pipe 9 to storage (not shown). This methanol may contain about 4 mg. sulfur as RSH per 100 cc., and is entirely satisfactory for use in the desulfurization of additional quantities of mercaptan-containing hydrocarbon oil. Had it been desirable to produce methanol substantially free of mercaptans, it would have been necessary to distill off approximately the first 15 percent of the mixture charged to tower 2, in lieu of the first 10 percent as above indicated.

As an alternate method of operation, we may charge to the fractionating tower 2 by means of valve-controlled pipe 1, a spent desulfurizing agent comprising a methanol-water solution containing sodium hydroxide and sodium mercaptides. Under the influence of heat supplied by coil 4, the sodium mercaptides are decomposed to mercaptans, and the latter along with the methanol and a portion of the water are vaporized and pass upwardly through the tower. During such passage the components are subjected to fractional distillation, whereby the mercaptan-methanol azeotrope is removed from the top of the tower, as vapor, by means of pipe 6, condensed in condenser 7, and withdrawn from the system through valve-controlled pipe 8 for further treatment. A liquid side stream comprising predominantly methanol and a small quantity of mercaptans is passed from the tower by means of valve-controlled pipe 10 and introduced into a side stream stripping column 11 provided with bubble trays 12 and heating coil 13. In this column the methanol is substantially freed of mercaptans and is withdrawn therefrom by means of valve-controlled pipe 14, while the strippings, i. e., mercaptan-methanol vapors, are passed from the top of the column and returned by pipe 15 to tower 2. The aqueous solution of regenerated sodium hydroxide, substantially free of methanol, is withdrawn from the bottom of tower 2 by means of valve-controlled pipe 9, and may be employed in making up fresh alcoholic-alkali solution for treating additional quantities of mercaptan-containing hydrocarbon oil. In accordance with our invention it is therefore possible to charge either a mercaptan-methanol mixture or a spent aqueous alcoholic alkaline treating agent to our separating system, and to obtain in one case, methanol having a substantially reduced mercaptan content, and in the other case desulfurized methanol and a regenerated aqueous alkaline solution.

The following examples serve to illustrate the results which may be obtained in accordance with our invention.

Methanol samples containing 18, 43, and 155 mg. mercaptan sulfur per 100 cc. were fractionally distilled, and the distillate fractions and undistilled residues were analyzed for mercaptan content. The mercaptan content of the methanol comprised essentially a mixture of mercaptans having from 1 to 6 carbon atoms per molecule. The results are presented in the following table.

| Charge to fractionating still | Distillate fractions | | |
|---|---|---|---|
| | Per cent of charge | Mg. S as RSH per 100 cc. | Percent of original RSH distilled |
| Methanol containing 18 mg. S as RSH per 100 cc. | 0-1 | 650 | 36.1 |
| | 1-2 | 320 | 53.8 |
| | 2-3 | 112 | 60.0 |
| | 3-4 | 100 | 65.2 |
| | 4-5 | 75 | 69.8 |
| | 5-10 | 35 | 79.6 |
| | 10-100 residue | 4 | 20.4 |
| Methanol containing 43 mg. S as RSH per 100 cc. | 0-1 | 1,700 | 39.4 |
| | 1-2 | 700 | 55.9 |
| | 2-3 | 400 | 65.1 |
| | 3-4 | 200 | 69.8 |
| | 4-5 | 100 | 72.1 |
| | 5-10 | 80 | 81.4 |
| | 10-100 residue | 8 | 18.6 |
| Methanol containing 155 mg. S as RSH per 100 cc. | 0-1 | 4,900 | 66.0 |
| | 1-2 | 1,900 | 78.5 |
| | 2-3 | 900 | 84.2 |
| | 3-5 | 450 | 89.9 |
| | 5-10 | 160 | 95.1 |
| | 10-15 | 60 | 97.0 |
| | 15-100 residue | 5 | 3.0 |

From the above results, it will be seen that the first 10 percent to 15 percent of the charge that distilled off contained the major proportion of the mercaptans initially present in the mercaptan-methanol mixture. Such distillate fraction apparently comprised an azeotropic methanol-mercaptan mixture boiling below the boiling point of alcohol, and was therefore separable therefrom by distillation. Since the boiling points of the mercaptans having more than 2 carbon atoms per molecule are higher than that of methanol, it is apparent that separation was not accomplished by simple fractional distillation, as the major portion of the methanol was recovered as a distillation residue.

While we have described our invention with reference to the separation of specific mercaptan-methanol mixtures, we are not limited thereto, but may apply our method to other mercaptan-solvent mixtures capable of forming azeotropes separable by distillation. For example, mixtures of mercaptans with other aliphatic alcohols such as ethanol, propanol, isopropanol, and the like may be separated in accordance with our invention.

What we claim is:

1. The method of separating mercaptans from a lower aliphatic alcohol containing same, said alcohol being in excess of the amount necessary to form an azeotrope with said mercaptans, which comprises heating the mercaptan-alcohol mixture to a temperature sufficient to vaporize therefrom a mercaptan-alcohol azeotrope having a boiling point below that of said alcohol, and separating the vaporized azeotrope from the alcohol having a substantially reduced mercaptan content.

2. The method of separating mercaptans from methanol containing same, said methanol being in excess of the amount necessary to form an azeotrope with said mercaptans, which comprises heating the mercaptan-methanol mixture to a temperature sufficient to vaporize therefrom a mercaptan-methanol azeotrope having a boiling point below that of said methanol, and separating the vaporized azeotrope from the methanol having a substantially reduced mercaptan content.

3. The method of separating mercaptans from methanol containing same, said methanol being in excess of the amount necessary to form an azeotrope with said mercaptans, which comprises distilling from the mercaptan-methanol mixture a mercaptan-methanol azeotrope having a boiling point below that of the methanol and comprising not more than about 15 percent by volume of the initial mixture.

LEONARD N. LEUM.
EDWIN R. BIRKHIMER.